June 14, 1932.   L. F. BOGIA   1,863,294
ELECTRIC MOTOR
Filed April 14, 1928   2 Sheets-Sheet 1
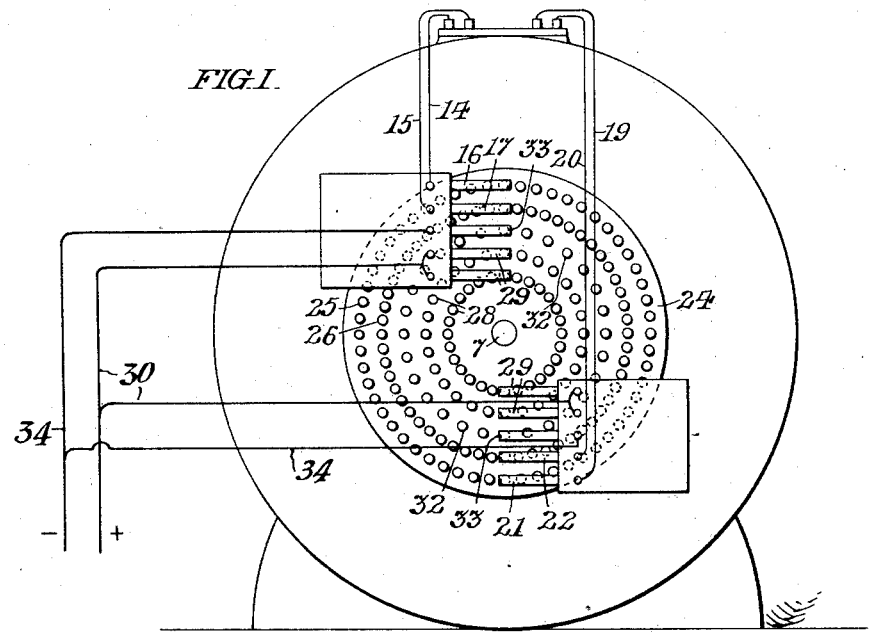
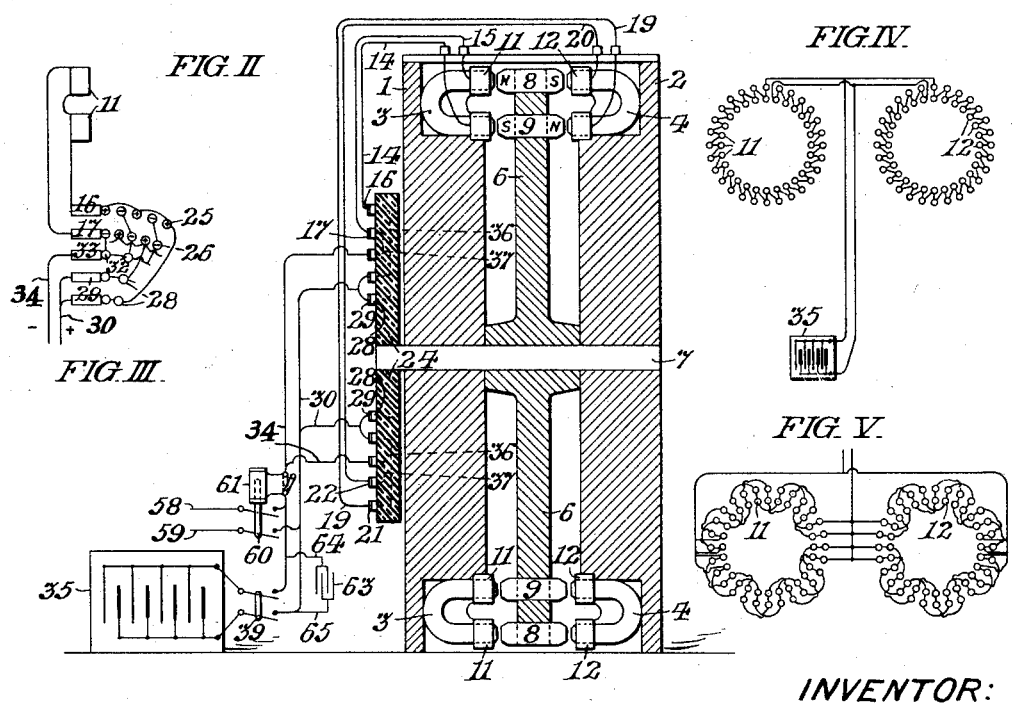
INVENTOR:
LOUIS FRANCIS BOGIA, June 14, 1932.  L. F. BOGIA  1,863,294
ELECTRIC MOTOR
Filed April 14, 1928  2 Sheets-Sheet 2
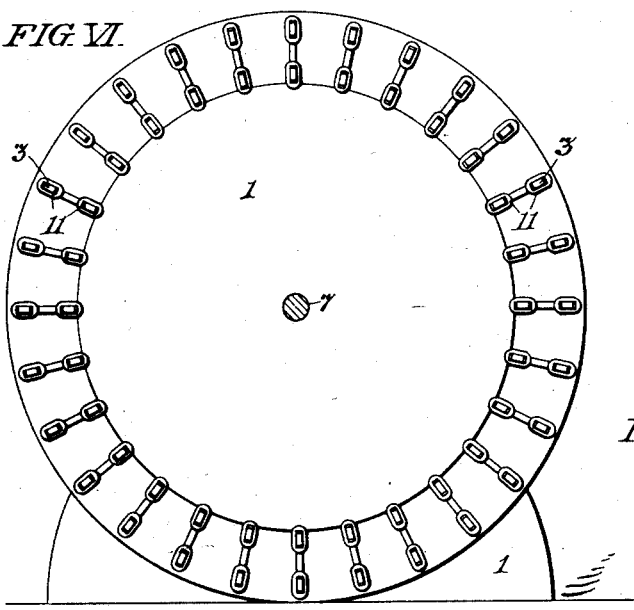
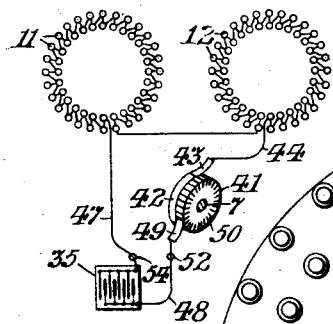
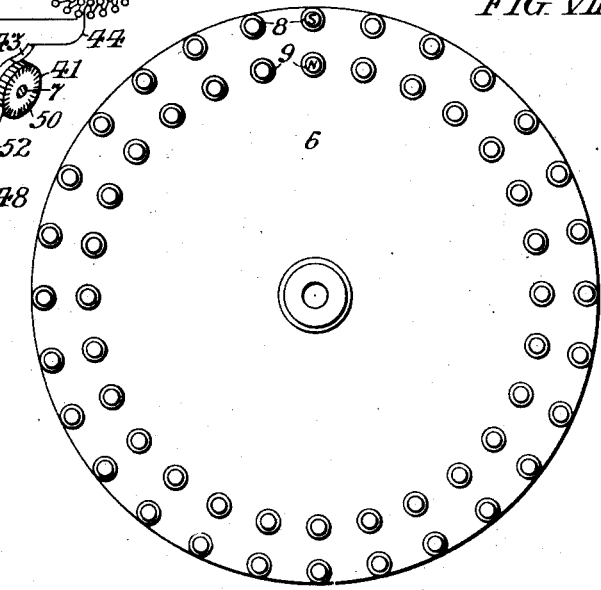
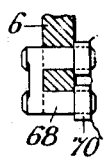
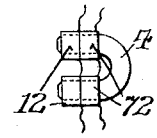
INVENTOR:
LOUIS FRANCIS BOGIA, Patented June 14, 1932

1,863,294

UNITED STATES PATENT OFFICE

LOUIS FRANCIS BOGIA, OF PHILADELPHIA, PENNSYLVANIA, ASSIGNOR OF ONE-THIRD TO WILLIAM A. WEAVER AND ONE-THIRD TO WALTER PINCUS, BOTH OF PHILADELPHIA, PENNSYLVANIA

ELECTRIC MOTOR

Application filed April 14, 1928. Serial No. 269,904.

It is the object and effect of my invention to utilize the force of permanent magnets as a principal factor in the operation of a rotary motor; modifying such force electrically, intermittently, and only to such extent as is necessary to turn the rotor past what would otherwise be dead centers.

In the form of my invention hereinafter described, the stator includes two stationary circular series of permanent magnets, of the horse-shoe type, with the poles of each disposed in radially spaced relation with reference to the axis of the rotor; the poles of the two series being opposed in such spaced relation as to permit the rotor to turn between them; said rotor including two circular series of permanent magnets, of the straight type, extending in parallel relation with the axis of the rotor and in alinement with the opposed poles of the stator magnets. The poles of the horse-shoe magnets are so disposed that the axially alined poles in the two series are of opposite polarity; and the rotor magnets are correspondingly arranged with their poles of opposite polarity; so that when the rotor magnets register with the stator magnets, north and south poles immediately adjoin each other with the development of magnetic attraction between the stator and the rotor magnets. If such condition were continuous, of course, the rotor would be turned by such magnetic attraction to bring its magnets in registry with the nearest stator magnets and would come to rest with its magnets in registry with the stator magnets. Therefore, to effect continued automatic turning movement of the rotor by magnetic force, I encircle each of the pole ends of the stator magnets with an electromagnetic coil and provide means to momentarily energize said coils with a polarity opposite to that of their permanent magnet cores, at the instant that the rotor magnets come into registry therewith; with the effect that the permanent magnetism of the stator magnets is momentarily dominated by the electromagnetic effect of said coils to create a magnetic force of repulsion between the poles of said stator magnets and the then adjacent poles of the rotor magnets; which force supplements the force of rotation which has been imparted to the rotor by the magnetic force of attraction between said magnets, to cause it to continue turning past the dead center of axial alinement of the magnets. However, such domination of the permanent magnetic force of attraction is terminated at the instant the magnets of the rotor come half way between the adjoining magnets in the series of stator magnets and the electromagnetism reversed; so that the permanent magnetic force of attraction is then dominant and augmented and causes the rotor to turn, in the same direction, to present its magnets in axial alinement with the next magnets in the stator series; whereupon, the permanent magnetism is again dominated as aforesaid, and so on.

In the form of my invention hereinafter described, I find it convenient to use a storage battery as the source of energy for the electromagnetic coils aforesaid and to control the same by a commutator rigidly mounted on the shaft of the rotor, so as to be turned therewith, in cooperative relation with brush terminals of the battery circuit. However, the required electrical energy may be input to the motor from any suitable source; for instance, such energy may be derived from a municipal supply circuit.

My invention includes the various novel features of construction and arrangement hereinafter more definitely specified.

In said drawings; Fig. I is an end elevation of a motor embodying my invention. Fig. II is a vertical diametrical sectional view of said motor. Fig. III is a diagram showing the electric connections of said motor. Fig. IV is a diagram showing a simplified electric circuit omitting the commutator but including electromagnets of such a motor in connection with a storage battery. Fig. V is a diagram omitting the commutator but showing a more complex multiple series relation of electro-magnets. Fig. VI is an elevation showing one of the series of stator magnets. Fig. VII is an elevation showing the series of rotor magnets. Fig. VIII is a diagram showing electric circuit connections of such a motor including a modified form of commutator. Fig. IX is an edge elevation of a modified form of stator magnet. Fig. X is a fragmentary radial sectional view of a rotor including modified forms of magnets. Fig. XI is an elevation of a modified form of magnets.

In said figures; the oppositely counterpart vertical stator frames 1 and 2 respectively support two stationary circular series of permanent magnets 3 and 4 which are rigidly mounted thereon in any convenient manner. Said magnets are of the horse-shoe type, with the poles of each disposed in radially spaced relation with reference to the axis of the rotor 6, which has the shaft 7 journaled in said frames 1 and 2. Said rotor carries two circular series of permanent magnets 8 and 9, of the straight type, extending in parallel relation with the axis of the rotor and respectively in alinement with the opposed poles of the stator magnets. The poles of the two series of stator magnets 3 and 4 are opposed in such spaced relation as to permit the rotor magnets to turn freely between them and are of opposite polarity in the two series; the rotor magnets being correspondingly arranged with their poles in reversed relation so as to be of opposite polarity to the stator magnets. Thus, the arrangement is such that when the rotor magnets register with the stator magnets, north and south poles immediately adjoin each other in each group of stator and rotor magnets, with the development of magnetic attractive force between the stator and rotor magnets. Of course, if such condition were static, the rotor would merely be turned by the attraction of said magnets to bring them into registry, as indicated in Fig. II, when the rotor would come to rest. Therefore, to effect continued automatic turning movement of the rotor, I encircle each of the pole ends of the stator magnets with an electro-magnetic coil respectively indicated at 11 and 12 in the two series and provide means to momentarily energize said coils with a polarity opposite to that of their permanent magnet cores, so as to substantially neutralize the magnetic force of attraction of the stator magnets at the instant that the rotor magnets come into registry therewith and to create a magnetic force of repulsion between the poles of said stator magnets and the then adjacent poles of the rotor magnets; which force supplements the momentum of rotation of the rotor, to cause it to continue turning past the dead center of axial alinement of the magnets. However, such neutralization of the externally manifested force of the stator magnets, which is initiated when the rotor magnets are at the limit of their approach to the stator magnets, is terminated at the instant the magnets of the rotor have reached the limit of their recession from the stator magnets; half way between the adjoining stator magnets in the circular series; so that the permanent magnetic force of attraction of the stator magnets is then dominant, and augmented by reversal of the current in the electromagnets, effected by the counter-electromotive force manifested at the instant the energizing circuit is broken at the commutator and causes the rotor to continue to turn, in the same direction, to present its magnets in axial alinement with the next magnets in advance, in the stator series. Whereupon, the permanent magnetism of the stator magnets is again modified and dominated as aforesaid; so that the rotor continues to turn in the same direction as long as the stator magnets are thus intermittently momentarily neutralized.

In the form of my invention shown in Figs. I, II and V; the circular series of the electro-magnet coils 11 which are respectively local to the poles of the permanent magnets 3 are connected in multiple series relation in a circuit including the conductors 14 and 15 respectively in connection with the spring contact brushes 16 and 17. The series of the electromagnet coils 12 which are respectively local to the poles of the permanent magnets 4 are similarly connected in multiple series relation in a circuit including the conductors 19 and 20 respectively in connection with the spring contact brushes 21 and 22. Such momentary substantial neutralization of the external force of the permanent stator magnets 3 and 4 is effected by means of the commutator 24 which is rigidly connected with the rotor shaft 7 and carries the two circular series of alternately oppositely polarized contact studs 25 and 26; said studs 25 being adapted to register with both the contact brushes 16 and 21; the studs 26 being adapted to register with both the contact brushes 17 and 22; and so that the polarity of the electromagnet coils 11 and 12 is alternative in accordance with the alternative polarity of the commutator studs indicated in Fig. III. Said commutator carries two concentric circular series of contact studs 28 for cooperation with four spring contact brushes 29 which are connected with the positive pole of the source of energy by the conductors 30. Said commutator also carries the single circular series of contact studs 32 for cooperation with two spring contact brushes 33 which are connected by the conductors 34, with the negative pole of the source of energy, exemplified by the storage battery 35. Said commutator carries the conductors 36 and 37 permanently connecting its contact studs, as indicated in Fig. II, so as to complete the circuits, as indicated diagrammatically in Fig. III, to simultaneously energize all of said coils 11 and 12, when the contact studs register with said contact brushes. Said circuits are broken, simultaneously, and reversed, by turning movement of the commutator; to reverse the polarity of said coils, alternately, as the circular series of contact studs 25 and 26 are presented in registry with said brushes; so that the permanent magnets 3 and 4 are alternately neutralized and strengthened by the electromagnets 11 and 12, to turn the rotor 6 as above described.

It is to be noted that in every form of my invention herein contemplated, the permanent magnetism of the several magnets is maintained by the intermittent charging effect of the electromagnets; such charging effect being facilitated by the low resistance at the poles when the relatively rotary magnets are in registry.

I find it convenient to include in the circuits above described, the double pole switch 39 to manually connect and disconnect the motor with the source of electrical energy. However, it is to be understood that any suitable means may be employed for making and braking the circuits of the electromagnets 11 and 12, and, in Fig. VIII, I have indicated a simplified arrangement of the electrical connections including the commutator 41 having the slip ring 42 permanently in contact with the brush 43 connected by the conductor 44 with one side of both of the respective series circuits including the electromagnets 11 and 12. The other side of said circuits is connected by the conductor 47 with the battery 35, and conductor 48 to the contact brush 49. Said commutator slip ring 42 is in electrical connection with all of the commutator segments 50, (which are indicated by the radial lines in Fig. VIII), and said contact brush 49 is arranged to register with said series of segments 50, and successively contact with them as the commutator is turned. The circuit is broken between said brush 49 and said segments 50 when the gaps between the latter are presented in registry with said brush. Said brush 49 may be connected with the terminal 52 of one side of a municipal supply circuit; the other terminal 54 of which is connected with the slip ring 42 by said brush 43. The effect of such arrangement is to simultaneously energize and de-energize all of the magnet coils 11 and 12 at the proper times, to intermittently substantially neutralize the externally manifested magnetic force of the permanent magnets 3 and 4 of the stator upon the permanent magnets 8 and 9 of the rotor, as above contemplated.

Of course, a commutator having contact segments parallel with its axis of rotation, similar to said segments 50, may be arranged to not only make and break the circuits of the electromagnets, as in Fig. VIII, but to also reverse the direction of current through them to alternately oppositely polarize said magnets 3 and 4 as above described with reference to Figs. I and II.

In fact, I may dispense with any commutator or similar circuit breaker, at the motor, by employing a low cycle alternating current generator as the source of electrical energy; the reversal of direction of the current at the generator being synchronized with the desired reversals of the polarity of the electromagnets in the motor.

Although I have indicated a storage battery as the source of energy in Fig. II; any other source may be substituted. In said figure; I have indicated municipal supply conductors 58 and 59 controlled by the double pole switch 60, arranged to be operated by the relay coil 61 which is included in the circuit controlled by the manually operative switch 39; so that when the latter is closed, said relay coil is energized to close the switch 60 to thus augment the energy supplied to the motor after the latter has been started with the battery current. The form of commutator shown in Figs. I and II is more liable to develop sparking at the contacts than commutators of the other type shown in Fig. VIII and, in order to suppress such sparking, I find it convenient to include the condenser 63 in the bridge circuit 64 and 65 across the terminals of the motor.

Although I have indicated the magnet cores as solid bodies; of course, it is preferable to laminate them. Moreover, the efficiency of the permanent magnets 3 and 4 which I have shown in simple form, may be increased in accordance with their shape and arrangement. For instance, in Fig. IX, I have shown an edge elevation of a modified form of stator magnet 67 which has its pole pieces inclined with respect to the axis of the rotor so as to project its field in the direction of rotation of the rotor. That is to say, the magnetic field may extend tangentially to a circle of rotation of the rotor instead of parallel with the axis of the latter.

Although I have shown straight permanent magnets 8 and 9 in said rotor 6, magnets 68 of horseshoe form may be substituted for the same, as indicated in Fig. X; such magnets being alternately reversed in position in the rotor. As indicated in Fig. X, the permanent rotor magnets may be provided with electromagnetic coils 70 and connected in circuit with the other coils to be simultaneously energized and reversed like the stator coils. Of course, if the rotor element of the motor is provided with means to intermittently neutralize the polarity of the permanent magnets and reverse such polarity; such a rotor may be used with stator magnets which are permanent and which are not provided with electromagnetic coils.

Although I have shown the poles of the permanent magnets aforesaid provided with single electromagnetic coils, for the purpose of alternately neutralizing and reinforcing the externally manifested magnetic force from the permanent magnets; it is to be understood that more than one coil may be applied to the permanent magnet poles for that or any other purpose, as indicated in Fig. XI, wherein the permanent magnet 4 is not only provided with the electromagnet 12 above described, but also with the auxiliary electromagnet coil 72 which may be used to augment or diminish the action of the coil 12, or may be used to generate electrical energy by the rotation of the motor. That is to say, my invention is not only applicable to a motor but to a motor generator.

It may be observed that in the complex arrangement of the coils shown in Fig. V, each coil is not only included in a series in multiple with the other coils, but that the coils of one such multiple series are disposed in alternate relation with the coils of another such multiple series, in each circular series indicated. Although I have found such complex arrangement advantageous in facilitating the operation of the motors which I have constructed in accordance with Figs. I and II; such arrangement of coils is not essential to the attainment of the fundamental effects aforesaid which are characteristic of my invention.

Therefore, I do not desire to limit myself to the precise details of construction and arrangement herein set forth, as it is obvious that various modifications may be made therein without departing from the essential features of my invention, as defined in the appended claims.

I claim:

1. In a rotary motor, the combination with a rotor including two circular series of permanent magnets, of the straight type, extending in parallel relation with the axis of the rotor; the poles of one series being reversed with respect to the poles of the other series; of a stator comprising two stationary circular series of permanent magnets, of the horseshoe type, with the poles of each disposed in radially spaced relation with reference to the axis of said rotor, and in correspondence with the magnets of said rotor; the poles of the two series being opposed in such spaced relation as to permit the rotor to turn between them; the poles of said stator magnets being of opposite polarity to the adjacent poles of the rotor magnets; electrically operative means arranged to momentarily substantially neutralize the externally manifest magnetic force of said stator magnets, when the rotor magnets are substantially at the limit of their approach thereto, and to render such neutralizing means inoperative, when the magnets of said rotor are substantially at the limit of their recession from the stator magnets, including a commutator carried by said rotor, comprising a circular series of segments, and conductors connecting certain of said segments, coil brushes in cooperative relation with said commutator, and conductors connecting said coils in series and with said brushes; supply brushes, in cooperative relation with said commutator; and a source of energy in connection with said supply brushes.

2. In a motor, the combination with two relatively movable circular series of permanent magnets; of electrically operative means arranged to momentarily substantially neutralize the externally manifest magnetic force of one of said series, when the magnets of both series are substantially at the limit of their approach; and means arranged to render such neutralizing means inoperative, when the magnets of both series are substantially at the limit of their recession.

3. In a motor, the combination with two circular series of permanent stator magnets of opposite polarity; of electromagnet coils respectively local to the poles of said magnets and means arranged to intermittently energize said coils with polarity opposite to that of the permanent magnets to which they are respectively local; and a rotor comprising a circular series of permanent magnets arranged to turn between the poles of said stator magnets; the polarity of said motor magnets being opposite to that of the stator magnets.

4. A motor as in claim 3; wherein the coils are connected in series in a circuit including a source of energy and means for making and breaking said circuit, including a commutator carried by said rotor and arranged to close the circuit through said coils when the rotor magnets are in registry with the stator magnets and to break said circuit when the rotor magnets are intermediate of the stator magnets.

5. A motor as in claim 2; including electromagnet coils respectively encircling poles of the series of permanent magnets to be neutralized and having a condenser bridged across its terminals in series with said coils.

In testimony whereof, I have hereunto signed my name at Philadelphia, Pennsylvania, this eleventh day of April, 1928.

LOUIS FRANCIS BOGIA.